(12) United States Patent
Lai et al.

(10) Patent No.: US 8,076,889 B2
(45) Date of Patent: Dec. 13, 2011

(54) SUPPORT DEVICE

(75) Inventors: Jin-Shi Lai, Shenzhen (CN); Yung-Hung Chu, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 421 days.

(21) Appl. No.: 12/413,587

(22) Filed: Mar. 29, 2009

(65) Prior Publication Data

US 2010/0116962 A1    May 13, 2010

(30) Foreign Application Priority Data

Nov. 10, 2008   (CN) .......................... 2008 1 0305469

(51) Int. Cl.
*G05B 19/33* (2006.01)
*G05B 19/19* (2006.01)
*B25J 9/18* (2006.01)

(52) U.S. Cl. ............... 318/575; 318/568.11; 318/568.13; 248/324; 248/278.1; 700/250; 700/254

(58) Field of Classification Search .................. 318/575, 318/568.11, 568.13, 568.22, 568.15; 700/250, 700/254, 258, 275, 261; 361/683; 345/156, 345/161; 248/324, 281.11, 278.1
See application file for complete search history.

(56) References Cited

U.S. PATENT DOCUMENTS

| | | | | |
|---|---|---|---|---|
| 4,937,759 A * | 6/1990 | Vold | .............................. | 700/262 |
| 4,973,215 A * | 11/1990 | Karlen et al. | ................. | 414/729 |
| 4,975,856 A * | 12/1990 | Vold et al. | ..................... | 700/263 |
| 5,155,423 A * | 10/1992 | Karlen et al. | ............ | 318/568.11 |
| 5,389,865 A * | 2/1995 | Jacobus et al. | ............ | 318/568.11 |
| 5,459,382 A * | 10/1995 | Jacobus et al. | ............ | 318/568.11 |
| 5,581,166 A * | 12/1996 | Eismann et al. | ......... | 318/568.22 |
| 5,629,594 A * | 5/1997 | Jacobus et al. | ............ | 318/568.11 |
| 5,831,408 A * | 11/1998 | Jacobus et al. | ............ | 318/568.11 |
| 6,104,158 A * | 8/2000 | Jacobus et al. | ............ | 318/568.11 |
| 6,801,008 B1 * | 10/2004 | Jacobus et al. | ............ | 318/568.11 |
| 7,296,774 B2 * | 11/2007 | Oh | ................. | 248/324 |
| 7,345,672 B2 * | 3/2008 | Jacobus et al. | ................ | 345/156 |
| 7,953,509 B2 * | 5/2011 | Murayama | .................... | 700/114 |
| 7,967,271 B2 * | 6/2011 | Oh | ................. | 248/324 |
| 2004/0164960 A1* | 8/2004 | Jacobus et al. | ................ | 345/161 |
| 2004/0228080 A1* | 11/2004 | Hillman et al. | ............... | 361/683 |
| 2004/0233623 A1* | 11/2004 | Hillman et al. | ............... | 361/683 |
| 2004/0257755 A1* | 12/2004 | Hillman et al. | ............... | 361/683 |
| 2005/0036283 A1* | 2/2005 | Hillman et al. | ............... | 361/683 |
| 2005/0041048 A1* | 2/2005 | Hillman et al. | ............... | 345/905 |
| 2005/0088812 A1* | 4/2005 | Hillman et al. | ............... | 361/683 |
| 2005/0088814 A1* | 4/2005 | Jobs et al. | ..................... | 361/683 |
| 2005/0179618 A1* | 8/2005 | Oh | ................... | 345/7 |

(Continued)

*Primary Examiner* — Paul Ip
(74) *Attorney, Agent, or Firm* — Altis Law Group, Inc.

(57) ABSTRACT

A support device adjustable in 3-DOF includes a base, a pitching arm, a rolling arm, a yawing arm, a pitching drive unit, a rolling drive unit, a yawing drive unit, and a controller. The rolling arm rotatably interconnects the pitching arm and the yawing arm. The pitching, rolling, and yawing drive units are configured for automatically driving the pitching, rolling, and yawing arms about pitch, roll, and yaw axes respectively. The roll axis is perpendicular to the pitch and yaw axes. The controller is configured for controlling the pitching, rolling and yawing drive units in response to control inputs. In use, a display panel can be attached to the yawing arm and automatically pitch, roll, and/or yaw by the respective drive units under control of the controller, to achieve an optimum viewing angle.

8 Claims, 4 Drawing Sheets

U.S. PATENT DOCUMENTS

| | | | |
|---|---|---|---|
| 2005/0234327 A1* | 10/2005 | Saracen et al. | 600/407 |
| 2006/0176655 A1* | 8/2006 | Hillman et al. | 361/683 |
| 2007/0014084 A1* | 1/2007 | Jobs et al. | 361/683 |
| 2007/0201197 A1* | 8/2007 | Hillman et al. | 361/681 |
| 2008/0105807 A1* | 5/2008 | Oh | 248/278.1 |
| 2008/0114486 A1* | 5/2008 | Oh | 700/213 |
| 2008/0272256 A1* | 11/2008 | Oh | 248/281.11 |
| 2009/0102620 A1* | 4/2009 | Kato et al. | 340/407.1 |
| 2009/0105880 A1* | 4/2009 | Okazaki | 700/258 |
| 2009/0216378 A1* | 8/2009 | Murayama | 700/275 |
| 2009/0289591 A1* | 11/2009 | Kassow et al. | 318/568.13 |
| 2010/0087955 A1* | 4/2010 | Tsusaka et al. | 700/245 |
| 2010/0114371 A1* | 5/2010 | Tsusaka et al. | 700/250 |
| 2010/0152896 A1* | 6/2010 | Komatsu et al. | 700/258 |
| 2010/0154117 A1* | 6/2010 | Odashima et al. | 5/87.1 |
| 2010/0185321 A1* | 7/2010 | Odashima | 700/230 |
| 2010/0234999 A1* | 9/2010 | Nakajima | 700/261 |
| 2010/0256812 A1* | 10/2010 | Tsusaka et al. | 700/254 |
| 2010/0286826 A1* | 11/2010 | Tsusaka et al. | 700/254 |
| 2010/0301539 A1* | 12/2010 | Murayama | 269/74 |
| 2011/0015785 A1* | 1/2011 | Tsusaka et al. | 700/254 |
| 2011/0071544 A1* | 3/2011 | Steger et al. | 606/130 |
| 2011/0106308 A1* | 5/2011 | Eliasson | 700/250 |

* cited by examiner

SUPPORT DEVICE

BACKGROUND

1. Technical Field

The disclosure relates to support devices and, particularly, to an automatic 3 Degrees of Freedom (3-DOF) support device.

2. Description of Related Art

3-DOF support devices have been proposed for supporting display panels. These support devices allow users to yaw and/or roll the display panels to achieve an optimum viewing angle. However, many currently used 3-DOF support devices typically require manual adjustment, which can be inconvenient.

Therefore, it is desirable to provide a 3-DOF support device which can overcome the limitations described.

DETAILED DESCRIPTION

Embodiments of the 3-DOF support device are described in detail below with reference to the drawings.

Figure 1:
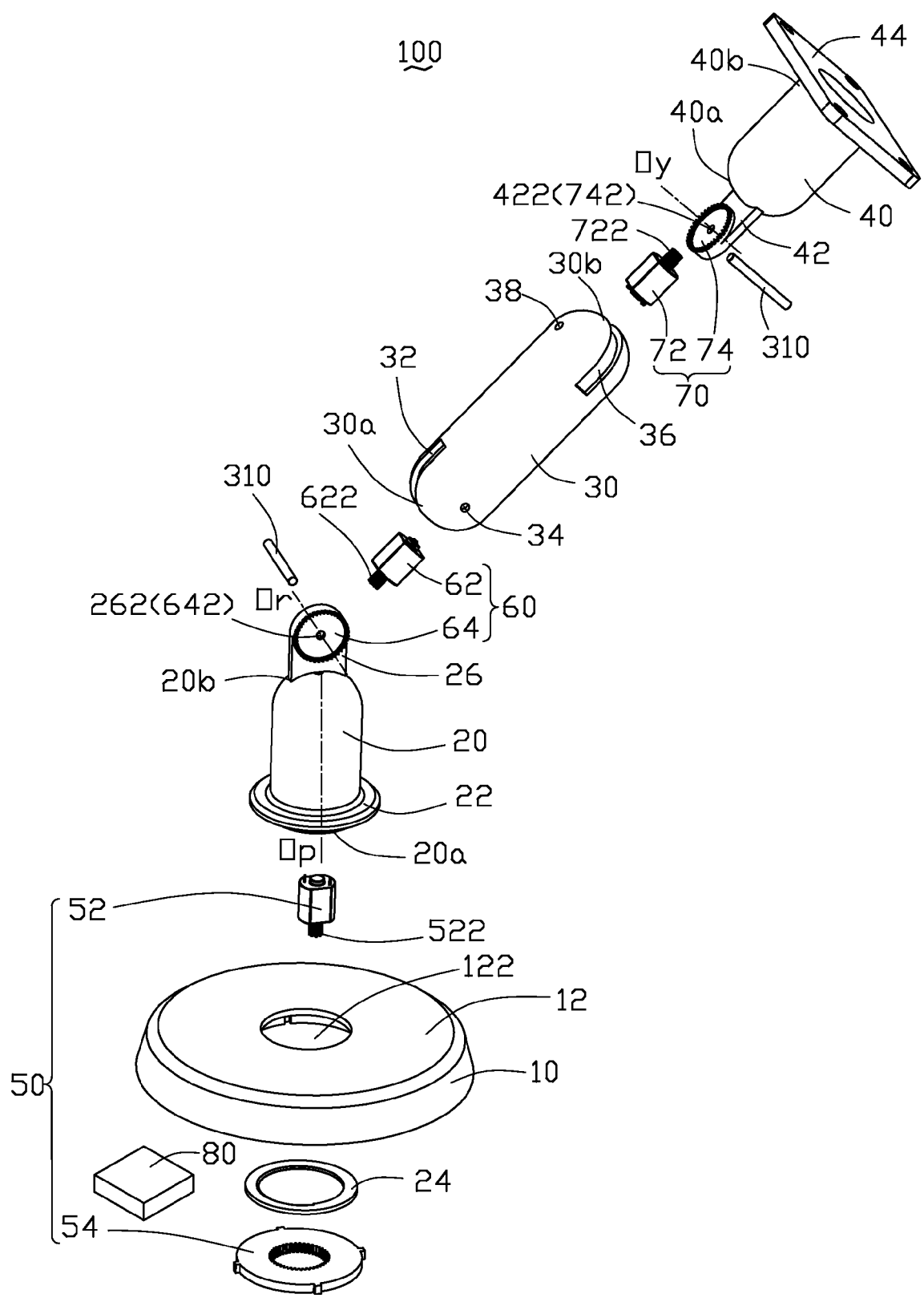
FIG. 1 is an isometric, exploded view of a 3-DOF support device according to an exemplary embodiment.
Figure 2:
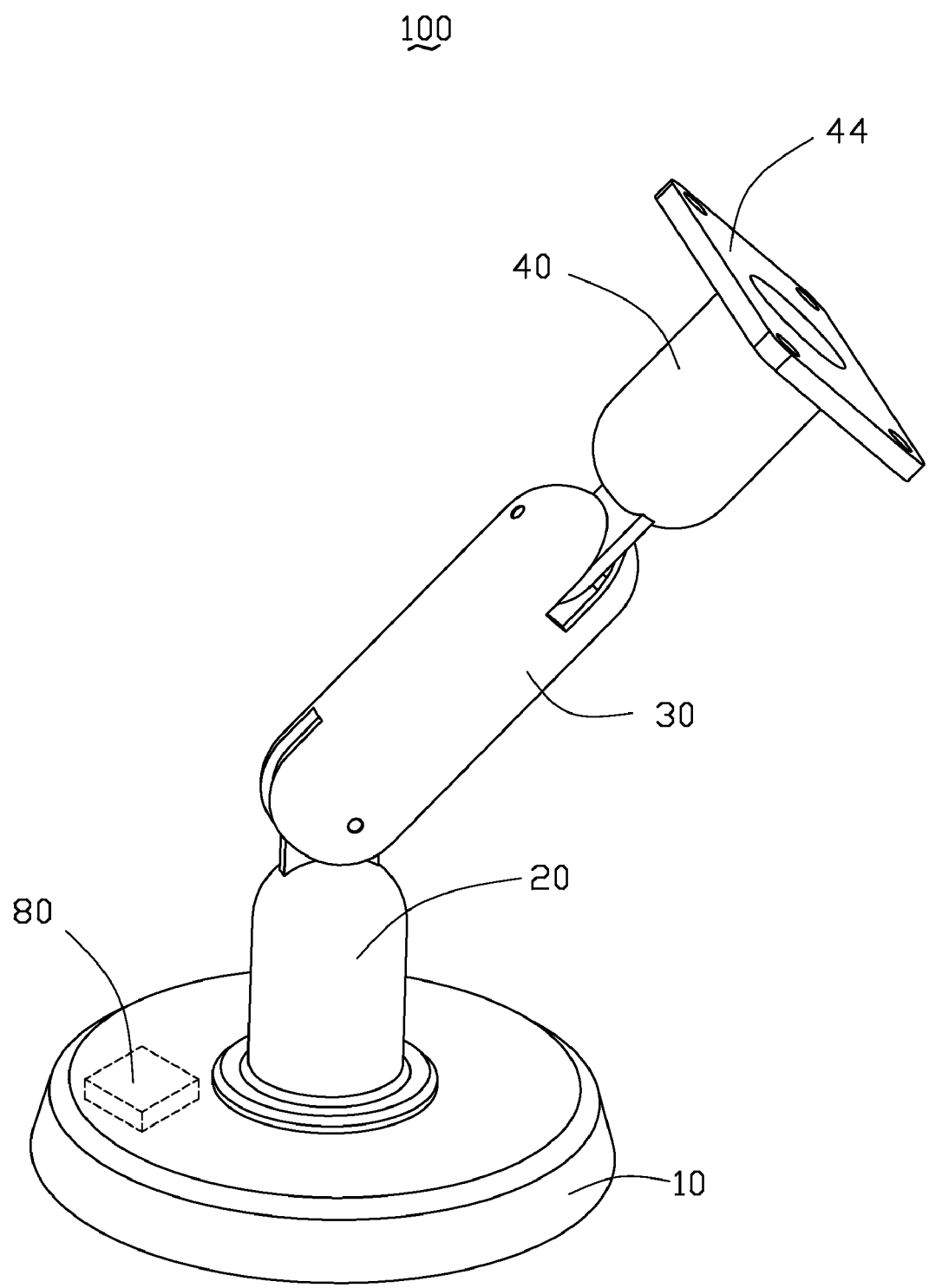
FIG. 2 is an isometric, assembled view of the 3-DOF support device of FIG. 1.

Referring to FIGS. 1-2, a 3-DOF support device 100, according to an exemplary embodiment, includes a base 10, a pitching arm 20, a rolling arm 30, a yawing arm 40, a pitching drive unit 50, a rolling drive unit 60, a yawing drive unit 70, and a controller 80. The pitching arm 20 is rotatably fixed to the base 10. The rolling arm 30 is rotatably coupled to the pitching arm 20. The yawing arm 40 is rotatably coupled to the rolling arm 30. The pitching drive unit 50 is configured for driving the pitching arm 20 to rotate about a pitch axis Op. The rolling drive unit 60 is configured for driving the rolling arm 30 to rotate about a roll axis Or, substantially perpendicular to the pitch axis Op. The yawing drive unit 70 is configured for driving the yawing arm 40 to rotate about a yaw axis Oy, substantially perpendicular to the roll axis Or. The controller 80 is configured for controlling the pitching drive unit 50, the rolling drive unit 60, and the yawing drive unit 70 in response to control inputs. In use, a display panel (not shown) can be attached to the yawing arm 40 and automatically pitch, roll, and/or yaw when driven by the pitching drive unit 50, the rolling drive unit 60, and the yawing drive unit 70, under control of the controller 80, to achieve an optimum viewing angle.

Figure 3:
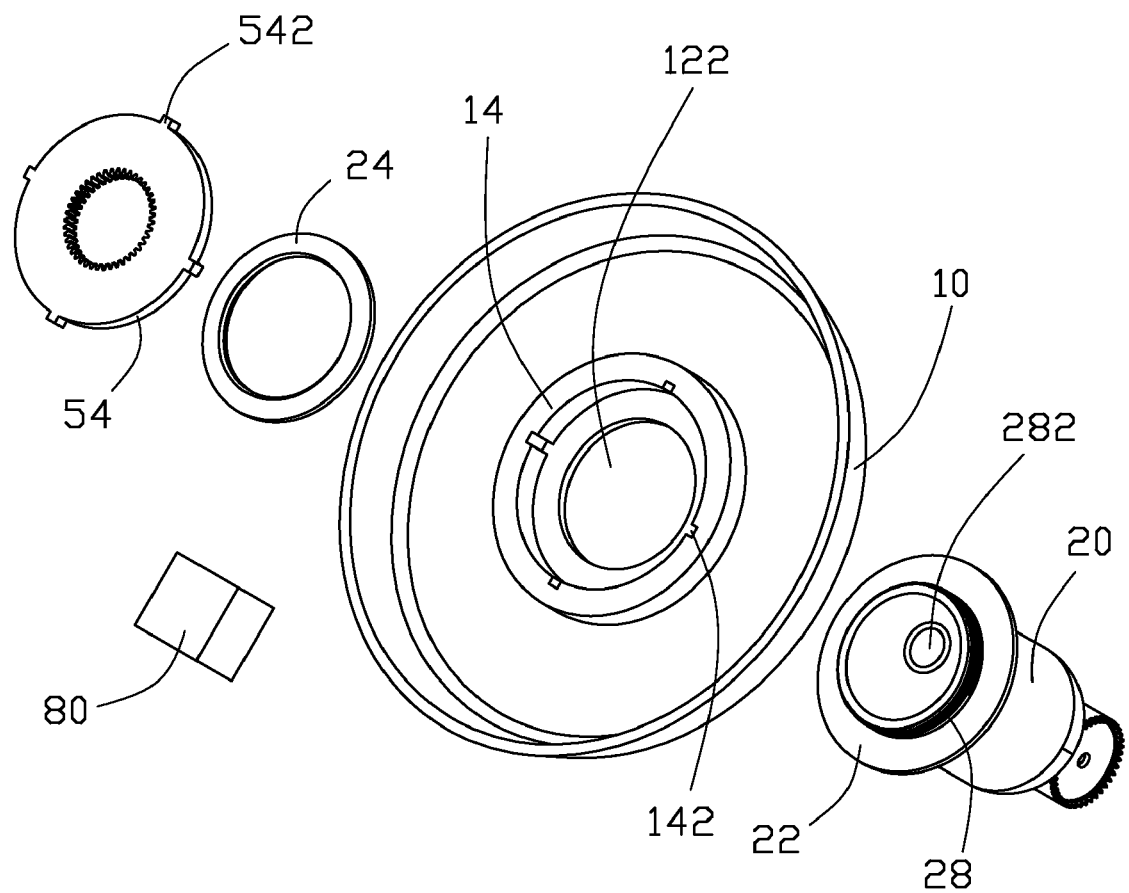
FIG. 3 is an isometric, exploded view of parts of the 3-DOF support device of FIG. 1, viewed from another angle.

Also referring to FIG. 3, the base 10 is inverted bowl-shaped and includes an upper plate 12 (see FIG. 1). The upper plate 12 defines an opening 122. In this embodiment, the opening 122 is circular. The base 10 also includes a fixing ring 14. The fixing ring 14 is fixed to the inner surface of the upper plate 12 and substantially coaxial with the opening 122. The fixing ring 14 defines four fixing slots 142 in the inner surface thereof.

The pitching arm 20 is cylindrical and includes a pitch end 20a and a support end 20b. The diameter of the pitching arm 20 is less than that of the opening 122. The pitching arm 20 also includes a stopping ring 22, a threaded stopping ring 24, and a rolling fulcrum plate 26. The stopping ring 22 sleeves on and is fixed to the pitching arm 20 at the pitch end 20a, reserving a proximal portion 28 thereof. The outer diameter of the stopping ring 22 exceeds that of the opening 122. The outer surface of the proximal portion 28 is threaded. The end surface of the proximal portion 28 defines a motor-receiving space 282 therein. The threaded stopping ring 24 is substantially similar to the stopping ring 22 in shape and is configured for engaging the proximal portion 28. The rolling fulcrum plate 26 extends outward, along the central line of the pitching arm 20, from the support end 20b, and defines a rolling fulcrum through hole 262. The central line of the rolling fulcrum through hole 262 is substantially perpendicular to the plane of the rolling fulcrum plate 26.

Figure 4:
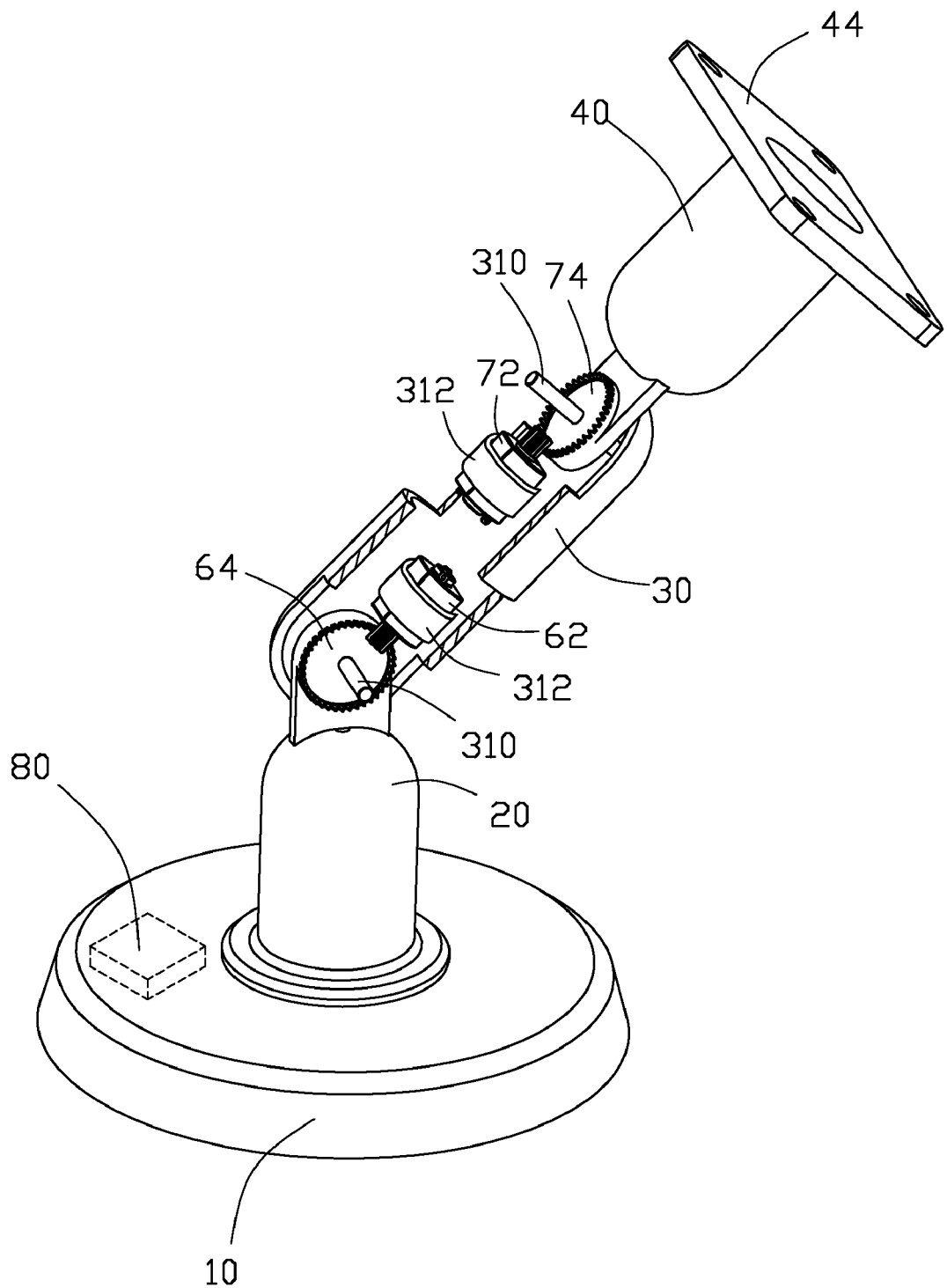
FIG. 4 is similar to FIG. 2, but shows a cross section of a rolling arm of the support device to reveal the inside thereof.

Also referring FIG. 4, the rolling arm 30 is a hollow cylinder and includes a closed rolling end 30a and a closed connecting end 30b. The rolling end 30a defines a rolling slot 32 along the central line of the rolling arm 30 depth-wise. The rolling end 30a also defines a rolling through hole 34, communicating with the rolling slot 32. The central line of the rolling through hole 34 is substantially perpendicular to the length and depth directions of the rolling slot 32. The connecting end 30b defines a yaw slot 36 along the central line of the rolling arm 30 depth-wise. The length direction of the yaw slot 36 is substantially perpendicular to that of the rolling slot 32. The connecting end 30b also defines a yaw through hole 38, communicating with the yaw slot 36. The central line of the yaw through hole 38 is substantially perpendicular to the length and depth directions of the yaw slot 36. Also, the rolling arm 30 includes two shafts 310 detachably fitted into the rolling through hole 34 and the yaw through hole 38 respectively. Furthermore, the rolling arm 30 includes two holding rings 312. The holding rings 312 are fixed to the interior of the rolling arm 30.

The yawing arm 40 is also cylindrical and includes a yawing end 40a and an attaching end 40b. The yawing arm 40 includes a yawing fulcrum plate 42 and an attaching plate 44. The yawing fulcrum plate 42 extends outward, along the central line of the yawing arm 40, from the yawing end 40a and defines a yawing fulcrum through hole 422. The central line of the yawing fulcrum through hole 422 is substantially perpendicular to the plane of the fulcrum plate 42. The attaching plate 44 is fixed at the attaching end 40b and configured for attaching the display panel.

The pitching drive unit 50 includes a pitching motor 52 and a pitching gear 54. The pitching motor 52 includes a pitching rotor 522. The outer surface of the pitching rotor 522 is geared. The pitching gear 54 is annular. The inner surface of the pitching gear 54 is geared, meshing accordingly with the pitching rotor 522. The pitching gear 54 includes four fixing blocks 542 radially extending outward from the outer surface thereof. The outer diameter of the pitching gear 54 is less than the inner diameter of the fixing ring 14.

The rolling drive unit 60 includes a rolling motor 62 and a rolling gear 64. The rolling motor 62 includes a rolling rotor 622. The outer surface of the rolling rotor 622 is geared. The rolling gear 64 is a crown gear and defines a rolling gear hole 642 along the central line of the rolling gear 64. The rolling gear 64 meshes with the rolling rotor 622.

The yawing drive unit 70 includes a yawing motor 72 and a yawing gear 74. The yawing motor 72 includes a yawing rotor 722. The outer surface of the yawing rotor 722 is geared. The yawing gear is also a crown gear and defines a yawing gear hole 742, along the central line of the yawing gear 74. The yawing gear 74 meshes with the yawing rotor 722.

In assembly, the proximal portion 28 of the pitching arm 20 is inserted through the opening 122 and engages the threaded stopping ring 24. Thereby, the pitching arm 20 is fixed to the base 10 and rotates about the central line of the pitching arm 20. Accordingly, the central line of the pitching arm 20 is defined as the pitch axis Op.

The pitching motor 52 is snugly fit into the motor-receiving space 282 such that the pitching rotor 522 protrudes into the fixing ring 14 and is appropriately positioned. The fixing blocks 542 are positioned such that when the pitching ring 54 fits into the fixing ring 14, the fixing blocks 542 correspondingly engage fixing slots 142, respectively. As a result, the pitching gear 54 is snugly and fixedly fit into the fixing ring 14, such that the teeth thereof mesh with the pitching rotor 522 and the fixing blocks 542 fit into the corresponding fixing slots 142. Thus, the pitching unit 50 rotates the pitching arm 20 about the pitch axis Op.

It should be mentioned that the number of fixing slots 142 and the fixing blocks 542 is not limited by those disclosed in this embodiment.

The rolling motor 62 and the yawing motor 72 are received in the interior of the rolling arm 30 and tightly fixed by the holding rings 312.

The rolling gear 64 is disposed such that the rolling gear hole 642 aligns with the rolling fulcrum through hole 262. The rolling fulcrum plate 26 and the rolling gear 64 are received in the rolling slot 32 such that the rolling through hole 34 also aligns with the rolling fulcrum through hole 262. The central line of the aligned holes is defined as the roll axis Or. The shaft 310 enters the rolling through hole 34 and the rolling fulcrum through hole 262 to rotatably connect the pitching arm 20 and the rolling arm 30. The holding ring 312 is appropriately positioned to hold the rolling motor 62. The rolling gear 64 meshes with the rolling rotor 622. Thereby, the rolling drive unit 60 rotates the rolling arm 30 about the roll axis Or.

The yawing gear 74 is disposed such that the yawing gear hole 742 aligns with the yawing fulcrum through hole 422. The yaw slot 36 is received by the yawing fulcrum plate 42 and the yawing gear 74 such that the yaw through hole 38 also aligns with the yawing fulcrum through hole 422. The central line of these aligned holes is defined as the yaw axis Or. The shaft 310 enters the yaw through hole 38 and the yawing fulcrum through hole 422 to rotatably connect the rolling arm 30 and the yawing arm 40. The holding ring 312 is appropriately positioned to hold the yawing motor 72. The yawing gear 74 meshes with the yawing rotor 722. Thereby, the yawing drive unit 60 can rotate the yawing arm 30 about the yaw axis Or.

The controller 80 is a chip, received in the base 10 and electrically connected to the pitching motor 52, the rolling motor 62, and the yawing motor 72, providing control in response to control inputs. It is to be noted that the position of the controller 80 is not limited by that disclosed in this embodiment and can be positioned in other components of the 3-DOF support device 100 while remaining well within the scope of this disclosure.

It should be mentioned that elements from the embodiments, to the degree practical, could potentially be combined and/or interchanged. Further, where a mating and/or fitting match between parts is prescribed, this fit should permit sliding therebetween to allow reasonably easy assembly/disassembly yet should be tight enough to otherwise minimize any potential lateral movement/vibration therebetween. It also should be mentioned that the fixing/coupling structures and the driving structures also not be limited by the disclosed embodiments but can take other forms.

While the disclosure has been described by way of example and in terms of preferred embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A support device adjustable in three degrees of freedom, the support device comprising:
   a base;
   a pitching arm rotatably fixed to the base and capable of rotating about a pitch axis;
   a rolling arm rotatably coupled to the pitching arm and capable of rotating about a roll axis substantially perpendicular to the pitch axis;
   a yawing arm rotatably coupled to the rolling arm and capable of rotating about a yawn axis substantially perpendicular to the roll axis;
   a pitching drive unit configured for rotating the pitching arm about the pitch axis;
   a rolling drive unit configured for rotating the rolling arm about the roll axis;
   a yawing drive unit configured for rotating the yawing arm about the yaw axis; and
   a controller configured for controlling the pitching drive unit, the rolling drive unit, and the yawing drive unit in response to control inputs.

2. The support device as claimed in claim 1, wherein the base is inverted bowl-shaped and comprises an upper plate; the upper plate defines an opening; the pitching arm is cylindrical and comprises a pitch end, a stopping ring, a threaded stopping ring, and a rolling fulcrum plate; the stopping ring sleeves on and is fixed to the pitch end while reserving a proximal portion at the pitch end; the diameter of the opening exceeds the diameter of the proximal portion but is smaller than the outer diameters of the stopping ring and the threaded stopping ring; and the proximal portion is inserted through the opening and engages the threaded stopping ring.

3. The support device as claimed in claim 2, wherein the proximal portion defines a motor-receiving space therein; the base comprises a fixing ring fixed to the inner surface of the upper plate substantially coaxial with the opening; the fixing ring defines a fixing slot in the inner surface thereof; the pitching drive unit comprises a motor and a gear; the motor comprises a rotor; the gear is ring-shaped and comprises teeth at the inner surface thereof and a fixing block extending outwards from the outer surface thereof; the motor is tightly received in the motor-receiving space; and the gear fits into the fixing ring such that the fixing block is engaged with the fixing slot and the rotor meshes with the gear.

4. The support device as claimed in claim 1, wherein the pitching arm comprises a support end and a rolling fulcrum plate; the rolling fulcrum plate extends outward, along the central line of the pitching arm, from the support end and defines a rolling fulcrum through hole; the central line of the rolling fulcrum through hole is substantially perpendicular to the central line of the pitching arm; the rolling arm comprises a rolling end; the rolling end defines a rolling slot along the central line of the rolling arm depth-wise and a rolling through hole communicating with the rolling slot; the central line of the rolling through hole is substantially perpendicular to the length and depth directions of the rolling slot; the rolling fulcrum plate fits into the rolling slot such that the rolling fulcrum through hole aligns with the rolling through hole; the rolling arm further comprises a shaft; and the shaft enters through the rolling through hole and the rolling fulcrum through hole.

5. The support device as claimed in claim 4, wherein the rolling drive unit comprises a motor and a gear; the motor comprises a rotor; the gear comprises a crown gear and a gear through hole through the center of the crown gear; the motor is received in the rolling arm such that the rotor enters the rolling slot; the gear is received in the rolling slot such that the gear through hole aligns with the rolling fulcrum through hole and enters thereinto by the shaft; and the gear meshes with the rotor.

6. The support device as claimed in claim 1, wherein the rolling arm comprises a connecting end defining a yaw slot along the central line of the rolling arm depth-wise and the roll axis in length; the connecting end also defines a yaw through hole; the central line of the yaw through hole is perpendicular to the length and depth directions of the yaw slot; the yawing arm comprises a yawing end and a yawing fulcrum plate; the yawing fulcrum plate extends along the central line of the yawing arm from the yawing end, and defines a yawing fulcrum through hole; the central line of the yawing fulcrum through hole is perpendicular to the central line of the yawing arm; the yawing fulcrum plate fits into the yaw slot such that the yawing fulcrum through hole aligns with the yaw through hole; the yawing arm comprises a shaft; and the shaft inserts through the aligned yawing fulcrum through hole and the yaw through hole.

7. The support device as claimed in claim 6, wherein the yawing drive unit comprises a motor and a gear; the motor comprises a rotor; the gear comprises a crown gear and defines a gear through hole through the center of the crown gear; the motor is received in the rolling arm such that the rotor protrudes in the yaw slot; the gear is received in the yaw slot such that the gear through hole aligns with the yaw through hole and enters thereinto by the shaft; and the gear meshes with the rotor.

8. The support device as claimed in claim 1, wherein the yawing arm comprises an attaching end and an attaching plate; the attaching plate is fixed to the attaching end and configured for a display panel to be attached thereto.

\* \* \* \* \*